United States Patent

Koda

[15] 3,689,789
[45] Sept. 5, 1972

[54] FAST DESTRUCTIVE-READ SCAN CONVERTER TUBE

[72] Inventor: Nobuo J. Koda, Vista, Calif.

[73] Assignee: Hughs Aircraft Company, Culver City, Calif.

[22] Filed: May 1, 1970

[21] Appl. No.: 33,753

[52] U.S. Cl..................................313/68 R, 315/11
[51] Int. Cl..........................H01j 31/58, H01j 31/64
[58] Field of Search..........................................313/68

[56] References Cited

UNITED STATES PATENTS

| | | | |
|---|---|---|---|
| 2,785,328 | 3/1957 | Kihn | 313/68 |
| 3,243,644 | 3/1966 | Roe | 313/68 X |
| 3,395,304 | 7/1968 | Duggan | 313/68 X |
| 2,518,434 | 8/1950 | Lubszynski | 313/65 T |
| 2,922,906 | 1/1960 | Day et al. | 313/65 T |
| 3,493,803 | 2/1970 | Koda et al. | 313/68 R |

FOREIGN PATENTS OR APPLICATIONS

| 675,608 | 7/1952 | Great Britain | 313/68 |

*Primary Examiner*—Robert Segal
*Attorney*—James R. Haskell and Robert H. Himes

[57] ABSTRACT

A scan conversion electron tube is disclosed for converting one type of raster scan to another with a destructive readout, thereby to allow only a limited number of readout scans. The tube is an elongated envelope having a writing gun on one side thereof and a reading gun at the other side with an improved storage target disposed intermediate the guns that possesses a dielectric relaxation time of the order of one second, thereby enabling the tube to operate at a write scan rate of from 10–30 frames/second.

8 Claims, 2 Drawing Figures

PATENTED SEP 5 1972 3,689,789

INVENTOR.
NOBUO J. KODA,
BY
Robert H. Himes
ATTORNEY.

FAST DESTRUCTIVE-READ SCAN CONVERTER TUBE

BACKGROUND OF THE INVENTION

In certain applications it is desired to transmit radar-type displays at television scan frequencies. Radar signals are derived from a relatively slow scanning frequency as compared to television scanning frequencies. For example, a typical radar scan frequency has a cycle time of about 10 seconds, in comparison with a television-type scan which may have a cycle time of one-thirtieth of a second. Electronic scan conversion systems must, therefore, employ some means for storing these slower scan signals while subsequently deriving faster scan signals corresponding thereto. In general, contemporary scan conversion tubes have utilized a storage target comprising a perforated conducting screen having on one side a coating of secondary emissive dielectric material. The target is disposed between a pair of opposed electronic guns, respectively referred to as writing and reading guns. The writing gun scans the coated side of the target in a first scan pattern and establishes thereon a charge pattern of stored electrical potential as a result of secondary emission of the dielectric material. The potential of the stored charge pattern is variable, depending upon the intensity of the writing beam and represents the input signals. The reading gun is disposed on the opposed side of the target and scans the uncoated side thereof in a different scan pattern and frequency. The reading beam penetrates the storage target and is modulated in specific relation to the charge pattern stored thereon. Thus a varying electronic current of the reading beam is obtained and is utilized to provide an output signal at the reading beam scan frequency corresponding to the charge pattern created by the writing beam and therefore related to the input signals.

Some scan converter tubes are designed and constructed for non-destructive readout, while others operate in the destructive-read mode. These latter tubes have the problem of a very high writing gun voltage and a rather slow destructive read, due to the high capacitance of the target. High capacitance causes a slow decay of information which results in smearing of fast-changing information. It is generally known that 0.2 seconds is the minimum destructive readout possible in contemporary scan converter tubes, because of the capacitance problem.

SUMMARY OF THE INVENTION

In accordance with the invention, an improved storage target is disposed intermediate write and read guns in an elongated symmetrical envelope. The improved storage target comprises a metallic mesh facing the write gun and a membrane spaced from the mesh by an insulative coating thereon facing the read gun. It is desirable that the membrane have a relaxation time constant of the order of from five to 10 times the write frame time. Otherwise, the read beam charging to read cathode, i.e., ground reference, and the write beam charging towards the storage mesh potential would soon reach an equilibrium condition in which no read signal would result. One suitable material for the membrane is an evaporated film of hexagonal zinc sulphide of from 0.2 to 0.4 microns thick. Another suitable membrane is a 50 to 1,000 A. film of magnesium oxide which can be achieved by oxidizing an evaporated magnesium film. A suitable insulative coating on the metallic mesh for supporting the membrane is calcium fluoride or magnesium fluoride.

DESCRIPTION

Figure 1:
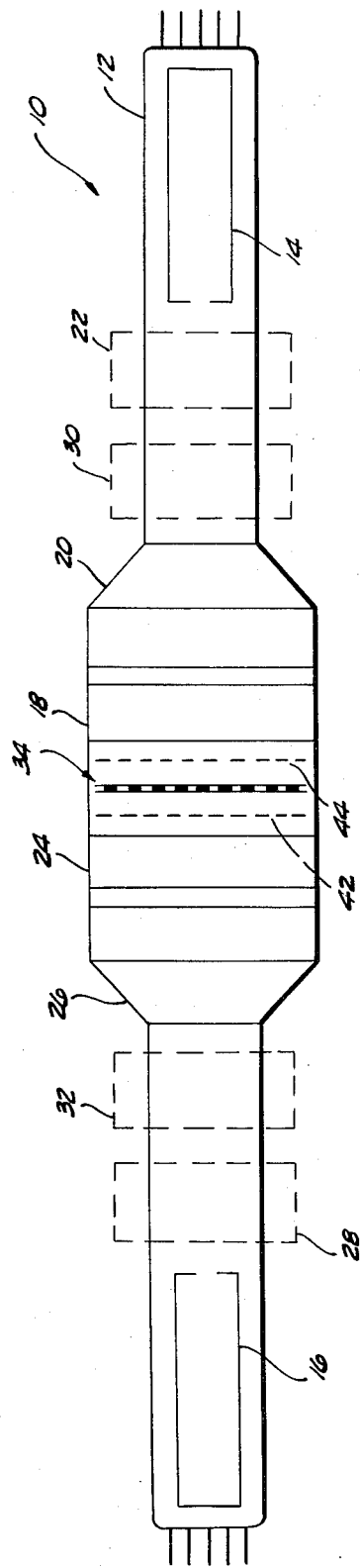
FIG. 1 illustrates a schematic representation of the scan converter tube of the present invention.

Describing the invention in detail and directing attention to the drawings, an evacuated cathode ray tube is indicated generally at 10 and comprises a tubular envelope 12 that is symmetrical about a longitudinal axis and composed of suitable insulating material such as glass. A reading gun 14 is located at the right extremity of envelope 12, as viewed in the drawing, and a writing gun 16 is positioned at the other end of the envelope 12. An appropriate collimating lens system 18, 20, together with a focussing coil 22 are positioned in operative association with the reading gun 14. Similarly, collimating lens system 24, 26, together with focussing coil 28 are positioned in operative association with the writing gun 16. Deflection yokes 30, 32 are in operative association with the reading and writing guns 14, 16, respectively. The guns, deflection means, and collimating lens systems are conventional structures, the function of which is well understood in the electronic tube art. A more detailed description of the same, therefore, is thought unnecessary. The deflection yokes 30, 32 may be electrostatic as well as electromagnetic, both of which types provide satisfactory operation.

Figure 2:
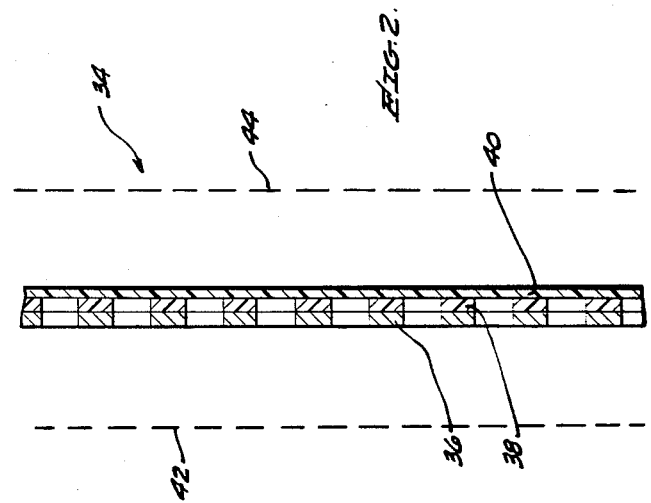
FIG. 2 is a cross-section of the storage screen, together with the write collector and the read collector electrodes in the apparatus of FIG. 1.

Centrally of the envelope 12, FIG. 2, a storage target is indicated generally at 34. The target 34, in its preferred form, comprises a metallic mesh electrode 36, which may be electroformed nickel or copper and may have, for example, approximately 1,000 holes per inch. An insulative layer 38 is disposed on the side of electrode 36 facing the reading gun 14 covering only the metallic portions or segments, leaving the interstices thereof open. The insulative layer 38 should be able to support upwards of from 10 to 25 volts and it may be provided by evaporating calcium fluoride or magnesium fluoride on the mesh electrode 36. A membrane 40 is then stretched over the insulative layer 38 of the target electrode 34 on the side of target assembly 34 facing the reading gun 14. One aspect of the membrane material choice is that there be sufficient conductivity through the thin membrane that it cannot support a large voltage difference across the film. With a write scan rate of about 10-30 frames/second, the dielectric relaxation time need be of the order of one second. This means a resistivity calculated from $\mu_o \rho \epsilon =$ 1.0 sec., wherein $\mu_o$ equals permitivity of free space, $\rho$ equals resistivity (ohm meters) and $\epsilon$ equals dielectric constant. If $\epsilon$ equals approximately 5, and $\mu_o$ equals $8.85 \times 10^{-12}$ (mks units) then $\mu$ equals approximately $2 \times 10^{10}$ ohm meters, or $2 \times 10^{12}$ ohm centimeters.

Thus, an evaporated film of zinc sulphide of about 100 to 1,000 A. thick is in this resistivity range, and accordingly appears to be suitable for the membrane 40.

Membranes fabricated from very good insulators are undesirable. Another material out of which membrane 40 can be fabricated is a very thin (50 to 1,000 A.) film of magnesium oxide. Such a membrane can be achieved by oxidizing an evaporated magnesium film. The very thinness of the membrane means that it will allow sufficient conductivity through the membrane within the interstices of mesh electrode 36. additional insulation provided by insulative layer 38 over the mesh segments of electrode 36 allows the read beam to maintain this region at the read cathode potential.

On each side of the target 34, collector electrodes 42, 44 are positioned and comprise conductive screens which allow high transmission of moving electrons. The collector electrodes or grids 42, 44 operate to collect secondary electrons emitted from the target 34.

Describing briefly the operation of the disclosed tube, it will be understood that the cathode of the reading gun 14 will be considered zero potential reference point. Initially, the write collector 42 and the read collector 44 have applied thereto a potential about 1,500 volts positive. In addition, the mesh electrode 36 of the target 34 is maintained at about 25 volts. The reading gun 14 is then energized and its beam is caused to scan the membrane 40 of target 34. The velocity of the beam generated by reading gun 14 is below the secondary emission crossover point for the dielectric material of membrane 40, so that the portions of the membrane 40 thus scanned receive a negative charge and are brought to the approximate potential of the cathode of reading gun 14. When this charge level is reached, the reading gun electrons no longer impinge on the membrane 40. Subsequently, the potential on the surface of membrane 40 facing the writing gun 16 assumes the potential on the surface thereof facing the reading gun 14. It is most important to maintain the region over the mesh segments of mesh 36 as an insulator with long time constant in order to enhance the output signal at the read collector 44.

To initiate the writing phase of the tube by the disposition of positive charges on the dielectric material of membrane 40 within the interstices of metallic mesh 36, the writing gun cathode is operated at a negative potential with respect to the dielectric potential and its beam is caused to scan the target 34 at a velocity above the secondary emission crossover point of the dielectric material of which membrane 40 is composed. Thus, positive charges are created on the membrane 40 that are related to the intensity and duration of the writing beam with reference to each discrete segment of the membrane 40 within the interstices of electrode 36. As is well known, the writing beam is intensity modulated in accordance with certain input signals which represent information to be displayed. Under these circumstances, the surface of the membrane 40 facing the reading gun 14 soon assumes a charge generated thereon by the writing gun 16, because of the high capacitive coupling to the read side and sufficient conductivity therethrough. Thereafter, the "reading" side of the target 34 is scanned by the reading beam and variable quantities of electrons are collected by the read collector 44, thereby generating an output signal which in effect is modulated in accordance with the charge pattern on the membrane 40. Thus the intelligence or information relating to the writing gun scan pattern is translated into an appropriate signal that is developed by the reading gun 14 which typically has a different scan pattern. As is apparent from the foregoing, the readout mode described above is destructive, in that the charges developed by the writing gun are soon returned to the reference potential of the reading gun cathode in the process of generating the output signal.

It should be noted that the physical separation between the write and read sections by the membrane and the lack of penetration of the membrane by the writing electron beam solves the problem of crosstalk. In conventional scan converter tubes, crosstalk between the writing and reading signals requires special read circuitry to separate the signals.

The invention as described is by way of illustration and not limitation and may be modified in various particulars within the scope of the appended claims.

What is claimed is:

1. An electronic storage tube for converting input electrical signals at a first scan pattern into output electrical signals at a second scan pattern, said electronic storage tube comprising
   a. a longitudinal evacuated envelope;
   b. a storage target disposed within said evacuated envelope including a metallic mesh electrode having an insulative layer on one side of and co-terminous with the mesh segments thereof and a continuous membrane of secondary electron emissive dielectric material disposed over said insulative layer;
   c. first collecting means for capturing secondary electrons from said one side of said mesh segments of said target;
   d. second collecting means for capturing secondary electrons from the side opposite from said one side of said mesh segments of said target; and
   e. a pair of electron guns positioned in said envelope for forming electron beams to respectively scan opposed sides of said target, the electron gun on the mesh electrode side of said target comprising a writing gun operative to scan said target in said first scan pattern to produce a charge pattern on said membrane of said storage target and the electron gun on the membrane side of said target comprising a reading gun operative to scan said target in said second scan pattern, whereby said secondary electrons captured on said membrane side of said target constitute a readout signal in said second scan pattern.

2. The electronic storage tube as defined in claim 1 wherein said continuous membrane of secondary electron emissive dielectric material has a transverse resistivity greater than about $10^{10}$ Ω cm.

3. The electronic storage tube as defined in claim 1 wherein said continuous membrane of secondary electron emissive dielectric material constitutes a magnesium oxide film.

4. The electronic storage tube as defined in claim 3 wherein said magnesium oxide film is no more than 2,000 angstrom thick.

5. The electronic storage tube as defined in claim 1 wherein said continuous membrane of secondary electron emissive dielectric material constitutes an evaporated film of zinc sulfide.

6. The electronic storage tube as defined in claim 5 wherein said evaporated film of zinc sulfide is no more than 4,000 angstrom thick.

7. The electronic storage tube as defined in claim 1 wherein said insulative layer is composed of calcium fluoride.

8. The electronic storage tube as defined in claim 1 wherein said insulative layer is composed of magnesium fluoride.

* * * * *